3,293,112
AMINO-CROSS LINKED OXIDIZED ALPHA-OLEFIN POLYMER
Clifton L. Kehr, Ednor, Md., assignor to W. R. Grace & Co., New York, N.Y., a corporation of Connecticut
No Drawing. Filed May 6, 1963, Ser. No. 278,389
The portion of the term of the patent subsequent to Mar. 2, 1982, has been disclaimed
30 Claims. (Cl. 161—219)

This invention relates to a novel and useful composition of matter, an improved crosslinking process utilizing said composition and the product resulting from said crosslinking process. More particularly it is directed to an emulsion of a crosslinkable oxidized α-olefin polymeric material, an improved crosslinking process for said emulsified material and the emulsion containing the crosslinked oxidized α-olefin polymeric material resulting therefrom.

As used herein the term "α-olefin polymeric material" means ethylene homopolymer and copolymers of ethylene and other α-olefins wherein said copolymer contains at least 50 mole percent ethylene. Thus copolymers of ethylene and butylene and ethylene-propylene rubber wherein the copolymers contain at least 50 mole percent ethylene and the balance is an α-olefin are operable in the instant invention. For purposes of description, the invention will be explained in terms of polyethylene as the α-olefin polymeric material unless otherwise noted.

Presently available emulsifiable polyethylenes are waxy, low molecular weight, branched polymers. These emulsifiable polyethylenes are low density polymers (i.e., 0.90–0.93) having low melting points, e.g., 90–110° C.

The coatings resulting from these waxy low molecular weight polymers have poor abrasion resistance and are fairly soft, a property which limits their usefulness in coatings, laminations, polishes, and impregnates for paper, paper board, textiles, glass, wood, metal, plastics, etc.

The only presently available emulsions of high molecular weight polyethylene are prepared by emulsion polymerization wherein the ethylene monomer is polymerized in an aqueous media in the presence of emulsifying agents. This process however is only operable with a radical initiated process and thus only low density polyethylene can be prepared by emulsion polymerization. Non-radical catalyst systems, such as the Ziegler or Phillips catalyst systems, which afford high density polyethylene, require anhydrous conditions.

Thus, although the high molecular weight low density polyethylene emulsions result in coatings having somewhat improved abrasion resistance (i.e., hardness) over emulsions from low density waxy polymers, there are still many end uses where presently available polyethylene emulsions do not have the requisite properties. For example, low density polyethylene emulsion cannot be used to coat articles which will be placed in boiling water, since the polymer softens at about 90–100° C.

In a copending application filed October 30, 1962, having Serial No. 234,228, of which this application is a continuation in part, there is disclosed a process for forming emulsions from high density linear polyethylene. Although these high density polyethylene emulsions result in coatings of improved abrasion and thermal resistance over the low density polyethylene emulsions of the prior art, the properties are still inferior to those of the instant invention. For example, properties such as hardness, solvent resistance, resistance to thermal deformation, and permeability of coatings, laminates, polishes and impregnates resulting from the crosslinked polyethylene emulsions of the instant invention are far superior to those presently in the art.

It is an object of the present invention to provide a composition comprising a crosslinkable oxidized polyethylene emulsion. A further object is to provide a novel and improved process for crosslinking an oxidized polyethylene in an emulsion state. Another object is to provide a product comprising a crosslinked oxidized polyethylene in an emulsion having improved hardness, and improved solvent, abrasion and thermal resistance. It is a still further object of this invention to provide stable aqueous emulsions containing crosslinked oxidized polyethylene. Other objects will become apparent from reading hereinafter.

These objects are accomplished by the present invention which provides a composition of matter comprising (A) an aqueous oxidized polyethylene emulsion and (B) a crosslinking agent comprising a polyfunctional compound containing at least 2 alkaline reacting primary amino groups.

The present invention also provides a process for forming a crosslinked oxidized polyethylene emulsion which comprises admixing with an oxidized polyethylene emulsion a polyfunctional compound containing at least 2 alkaline reacting primary amino groups.

The invention further provides the crosslinked oxidized polyethylene product either in emulsion form or in coatings, impregnations, polishes and laminations resulting from application of said emulsion.

As used in the present invention, unless otherwise specified, the term "emulsion" means a polymer dispersion in which water forms the continuous phase.

By the term "polyfunctional compound" as used throughout this invention is meant a compound containing at least 2 alkaline reacting primary amino ($-NH_2$) groups or its full equivalent, i.e., a precurser, which decomposes either hydrolytically or thermally under the conditions of crosslinking described herein to form in situ a polyfunctional compound containing at least 2 alkaline reacting amino ($-NH_2$) group. The precursers will be more fully explained hereinafter.

By "alkaline reacting" as used herein is meant that at least two of the amino ($-NH_2$) group' on the polyfunctional compound are capable of reaction with an equivalent amount of acid.

The above polyfunctional compounds include but are not limited to compounds such as hydrazine; triazane; tetrazane; triazene; guanidine; aminoguanidine; diaminoguanidine; triaminoguanidine; adipic acid dihydrazide; ethylenediamine; 1,2-propanediamine; 1,3-propanediamine; hexamethylene diamine; diethylenetriamine; triethylenetetramine; tetraethylenepentamine; o-, m-, or p-phenylenediamine; 1,2,4-triaminobenzene; 1,3,5-triaminobenzene, etc.; 2,4-diaminotoluene; 2,4,6-triaminotoluene, etc.; 2,4-diaminoanisole; 1,2-diamino-4-nitrobenzene; 1,2-diaminocyclohexane; o-, m-, or p-xylene diamine; 4,4'-diaminodiphenylmethane; 1,8 - diaminonapthalene; 2,7 - diaminonapthalene, etc.; 2,7-diaminofluorene; 2,4-diamino-n-butyric acid; 2,6-diaminopyridine; 2,4,5,6-tetraaminopyrimidine; 2-hydroxyethyl - 1,4 - diaminobutane; 3,3'-dichloro-4,4'-diaminodiphenylmethane; carbohydrazide; 1,2-dihydrazinoethane; 1,4 - dihydrazinobenzene; 2,4 - dihydrazinotoluene; 2,4-dihydrazino - 1 - nitrobenzene; terephthalaldehyde dihydrazone; 4-methyl-isophthalaldehyde dihydrazone, and the like.

It should be pointed out that the crosslinking reaction usually is carried out by adding the polyfunctional compound to the oxidized polymer emulsion. However, at times it is advantageous to carry out the crosslinking reaction directly in the presence of the substrate to which the emulsion is to be applied. For example, it would be possible to pretreat a fabric, a fiber suspension, or a plywood surface, etc., with an aqueous solution of the polyfunctional compound and subsequently treat said substrate fabric suspension, or plywood surface, etc., with the uncrosslinked oxidized polyethylene emulsion. In this case, the crosslinking reaction would take place at or near the surface of the substrate and may thereby promote a more intimate, permanent and efficient attachment of the crosslinked oxidized polyethylene to said substrate, It is also possible to reverse this order of treatment, i.e, treat the substrate first with uncrosslinked polyethylene emulsion and subsequently expose the coated substrate to the polyfunctional crosslinking agent, either in solution or in the vapor phase, etc.

It has also been found that compounds which are precursers of the polyfunctional compounds as described above are operable as crosslinking agents in this invention. By the term "precursers" as used herein is meant any compound or combination of compounds which under the conditions of crosslinking as described herein forms in situ a polyfunctional compound containing at least two alkaline reactive primary amino (—NH$_2$) groups. Several different types of operable precursers are included in but not limited to the following (1) mixture of monoprimary amines which interact chemically to form diamines in situ. For example, ethanolamine with an equivalent amount of β-alanine reacts through esterification to form aminoethyl-β-aminopropionate, i.e.,

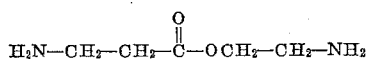

which is an operable polyfunctional compound in the present invention. Another example is an equimolar mixture of allyl amine and 2-mercaptoethylamine which through mercapto addition to the double bond yields

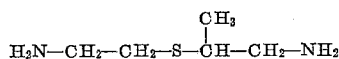

which can serve as an operable crosslinking agent in the instant invention. (2) Compounds which when exposed to the crosslinking conditions of the present invention, decompose thermally or hydrolytically to yield diamines in situ. Examples of such compounds include but are not limited to ethylenediamine carbamate

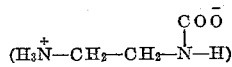

hexamethylenediamine carbamate

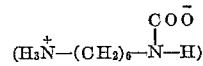

N-acetylhexamethylenediamine

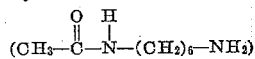

N,N'-diisopropylidene-1,6-hexanediamine; N,N' - diisopropylidine hydrazine; N,N'-diacetylhydrazine; N,N'-diacetyl-1,6-hexanedioic acid dihydrazide and semicarbazide. (3) Amine salts with organic or inorganic acids. Ethylenediamine hydrochloride; hexamethylenediamine monooleate, hydrazine hydrochloride, hydrazine oleate and hydrazine acetate, etc., are examples of this latter type. An example showing the use of a precurser as a crosslinking agent will be given hereinafter.

In summary this invention is directed to producing a crosslinked oxidized polyethylene in an emulsion having improved hardness, permeability, and improved solvent, abrasion and thermal resistance when applied as a coating, polish, laminate or impregnate which comprises emulsifying oxidized polyethylene having a carbonyl content of 0.1–4.0 milliequivalents/gm. of oxidized polyethylene in an aqueous solution containing an emulsifying agent and approximately sufficient base to neutralize the acid groups in the emulsion at a temperature ranging from the melting point of the polyethylene up to 200° C. and sufficient pressure to maintain the aqueous solution in the liquid phase and thereafter crosslinking the emulsified polymer by admixing with the thus formed emulsion 0.05 to 20.0 milliequivalents/milliequivalent, preferably 0.2 to 2.0 milliequivalents/milliequivalent of carbonyl in the oxidized polyethylene, of a polyfunctional compound containing at least 2 alkaline reacting primary amino groups.

By the term "milliequivalents of a polyfunctional compound containing at least 2 alkaline reacting primary amino groups/milliequivalent of carbonyl in the oxidized polyethylene" is meant the number of milliequivalents necessary for a crosslinking reaction, namely one primary —NH$_2$ group/carbonyl group.

In practicing this invention it is critical that the polyfunctional compound employed as a crosslinking agent, is not added until emulsification of the oxidized polyethylene is complete. The addition of the crosslinking agent prior to or before completion of the emulsification step causes the oxidized polyethylene to crosslink before the polymer particles are sufficiently finely divided to emulsify. Polyethylene which has been crosslinked to a three dimensional network cannot be divided into droplets fine enough to emulsify and form a stable emulsion. Thus the polyfunctional compound used as a crosslinking agent can only be added subsequent to the emulsion step, either while the emulsified polymer is still molten or after cooling the oxidized polyethylene emulsion below the melting point of the polymer, e.g., to room temperature.

Prior to the emulsification step, the method by which the polyethylene is oxidized to form the requisite amount of carbonyl in the polymer chain is not critical. Polyethylene can be readily oxidized by various well-known methods to give polymers containing carbonyl groups. The techniques for introducing carbonyl groups into polyethylene are exemplified by but are not limited to the following methods: For example, polyethylene can be milled in ozone and/or air at a temperature in the range 70–200° C. Another method would include passing ozone and/or air into an oven over a solid polyethylene therein at a temperature below the melting point of the polymer, e.g., about 70–135° C. Still another method would be to suspend particles of polyethylene in water or an organic solvent and either bubble air through the suspension or pressurize the system with air at 70–200° C. Yet another method would be to pass ozone and/or air at a temperature below the melting point of the polymer through a fluidized bed of polyethylene particles. A further method would include pressing the polyethylene into film and passing hot air at a temperature of 70–200° C. thereover. In all the aforestated methods of oxidizing polyethylene, if desired, a minor amount, i.e., 0.05 to 5% by weight of an organic peroxide, nitrogen tetroxide or other oxidation catalyst may be blended with the polymer to increase the oxidation rate. The polyethylenes of the instant invention can also be oxidized in the melt.

Another method for introducing carbonyl groups into polyethylene is the reaction of maleic anhydride (or other α,β-unsaturated acids, esters or anhydrides) with polyethylene or telomers thereof; this reaction is promoted by the presence of unsaturated groupings in the polyethylene, or, alternately, can be caused to occur by the use of free radical-forming catalysts such as peroxides, ozone, air, etc., even in the absence of unsaturated groupings in the polyethylene. Still another method for introducing carbonyl groups into polyethylene is the copolymerization of ethylene with other polar carbonyl-containing monomers to give carbonyl-containing ethylene copolymers.

Any of the various well-known types of polyethylene can be used in making crosslinked polyethylene emulsions by the process of this invention. Such polyethylenes include the branched low-density (i.e., about .910 to about .925) material as well as the medium density materials and the newer linear high density (about .950 to .980) materials made by the Ziegler process (TiCl-Al alkyl catalyst) and the Phillips process (hexavalent chromia on silica-alumina support). The linear polyethylene have melting points in the range of 120–137° centigrade and the branched low density polyethylenes have melting points in the range 90–110° C.

It has been found also that α-olefinic copolymers of ethylene are operable in making crosslinked polyethylene emulsions by the process of this invention. Examples of such copolymers are, for instance, ethylene/propylene and ethylene/butylene copolymers. In these ethylene containing copolymers, the units of ethylene are in the range 99.9–50 mole percent of the total monomer unit content of the copolymer. In such copolymers it is not critical to the success of this invention whether the carbonyl-containing groups formed during the oxidation result from attack on the ethylene units or on the comonomer units. In either case the resulting carbonyl groups can be used to crosslink the polymer by the method of this invention.

The general procedure of performing the present invention is to oxidize the polyethylene by one of the aforementioned methods, e.g. admix the polyethylene preferably in particulate solid form, with an organic peroxide (usually 0.1 to 5.0% peroxide by weight of polymer) in a suitable mixing mechanism, e.g., Twin Shell blender at room temperature. Preferably, the organic peroxide is solubilized in a hydrocarbon solvent which solvent is thereafter evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide employed and its inertness thereto. Operable solvents include volatile aromatic and aliphatic hydrocarbons such as benzene, toluene, pentane, hexane and the like.

The thus blended polymer-peroxide mixture is then subjected to oxidation. One method of oxidation is to pass ozone and/or air over the mixture while being heated in an oven at temperatures up to the melting point of the polymer. Another method is to pass air, oxygen, or ozone-containing air through a fluidized bed of the polymer-peroxide mixture while maintaining it at a temperature below the melting point of the polymer. Since the rate of oxidation increases with increasing temperature, it is preferred to carry out the oxidation at as high a temperature as possible without melting the polymeric material. Thus temperatures within 20° C. below the melting point of the polymer are usually employed. As oxidation proceeds, the molecular weight of the polymer decreases, and in prior art procedures one must preclude the oxidation before the polymer degrades to such an extent that it no longer has a sufficiently high molecular weight to form a useful emulsion. This is especially true for low density polyethylene which ordinarily has a lower molecular weight than high density polyethylene due to the inherent chain termination of its radical catalyst system.

Hence, although prolonged oxidation increases the concentration of carboxyl groups in the polymer, thus improving emulsification, it also decreases the molecular weight of the polymer thereby decreasing the flexibility, abrasion resistance, etc. of the resulting coating or polish. For example it is possible to oxidize polyethylene to the extent that 2.0 milliequivalents carboxyl per gram of polymer is present in the polymer. However, the resulting polymer is a low molecular weight material with very poor abrasion resistance.

The practice of the present invention allows one to oxidize to a high carboxyl content without being limited by a molecular weight decrease since the molecular weight of the polymer can be increased after emulsification by crosslinking.

The oxidation step can be terminated at any operable degree of oxidation and, if desired, subsequently stabilized. For example, a suitable antioxidant such as 4,4'-thiobis(6,t-butyl-meta-cresol) sold under the trade name "Santonox" by Monsanto Chemical Company or N-phenyl-2-napthyl-amine can be added to the oxidized polymer. However, stabilization of the oxidized polymer is required only to obtain accurate melt index measurements. In actual practice the oxidized polymer is not ordinarily stabilized in making emulsions.

The oxidized polyethylene of the instant invention is readily emulsified in a continuous aqueous phase in the presence of suitable emulsifiers and sufficient base to neutralize the carboxylic acid groups present in the polymer. Both ionic and non-ionic emulsifying agents well known in the prior art are operable to emulsify the oxidized polymer. Ionic emulsifiers include, in the anionic class, amine salts of fatty acids. Morpholine, monoethanol amine, 2-amino-2-methyl-1-propanol and the like are suitable amines. Operable fatty acids include oleic, stearic, palmitic, myristic and the like higher fatty acids. Sodium, potassium and ammonium salts of the fatty acids are also operable but are somewhat less satisfactory. Salts of alkyl aryl sulfonic acids have also been used as emulsifying agents with good results. Operable ionic emulsifiers in the cationic class include but are not limited to acetate salts of long chain aliphatic amines. Polyoxyethylene esters of fatty acids, polyoxyethylene derivatives of sorbitans or of fatty acid substituted sorbitans, polyoxyethylene ethers of long chain alcohols, polyoxyethylene ethers of alkyl aryl phenols or combinations thereof are examples of a few nonionic emulsifiers operable in this invention. In general, it has been found that non-ionic emulsifiers afford somewhat more stable emulsions than ionic surfactants.

The amount of base added to the emulsion ranges from 50% to 200% of the theoretical amount required to neutralize the acid groups on the polymer. When anionic emulsifiers such as amine salts of fatty acids are used, one generally adds an excess of the amine moiety to serve as the base.

The water: oxidized polymer ratio in the prepared emulsion is in the range 80 to 2000:100 parts by weight, preferably 150 to 1000:100 parts by weight, and can subsequently be diluted or concentrated as desired for any particular end use.

After oxidation, the oxidized polyethylene, emulsifier, base, and water are combined in any order in a pressure reactor equipped with an efficient stirrer. The reactor is sealed and the mixture is heated with vigorous stirring to a temperature ranging from the melting point of the oxidized polyethylene up to 200° C. or more (preferably 110–160° C.) and maintained thereat for periods ranging from 5 minutes to 6 hours under the pressure of the system. In the case of oxidized low density polyethylene the alternate wax-to-water method of emulsification can be used if desired. In said method, the oxidized low density polyethylene and emulsifier are heated together to about 120° C. The base is added and the resulting mixture is poured into vigorously stirred water at about 90–100° C. for emulsification.

Following the emulsification, the crosslinking agent consisting of a polyfunctional compound containing at least 2 alkaline reacting primary amino groups is added to the emulsion. The polyfunctional compound can be added to the emulsion while the emulsified polymer is still molten or after the emulsion has been cooled. Thus the temperature of the crosslinking step is not critical and may be performed at or above the melting point of the emulsified polymer or during or after cooling the emulsion to room temperature. The emulsion is stirred for about 1 minute to about 4 hours while the crosslinking reaction takes place.

The degree of crosslinking can be measured in various ways. One method used herein, of ascertaining the degree of crosslinking is by measuring the melt index of the polymer before and after the crosslinking reaction. Melt index is a measure of polyethylene flow at preset conditions of temperature, pressure, load and time through an orifice of defined diameter and length, all as specified in ASTMD 1238–56T. Since melt index varies inversely with viscosity which varies directly with the degree of crosslinking, a lower melt index after the crosslinking reaction evidences that crosslinking occurred. Another method of measuring the degree of crosslinking in the instant invention is the reduction in the percent carbonyl after the crosslinking reaction. A still further method employed herein to measure crosslinking is to measure the amount of xylene-insoluble polyethylene, i.e., referred to as percent gel content, resulting from the crosslinking reaction.

The following examples are set down to illustrate the invention and are not deemed to limit its scope. Throughout the instant invention tests were conducted as follows:

The extent of oxidation of polyethylene was determined by ascertaining the carboxyl content of the polymeric material by titration with base in the following manner. About 1 g. of the polymer to be analyzed was accurately weighed and dissolved in 100 ml. of xylene by heating to 120–130° C. with stirring in a 500 ml. Erlenmeyer flask on a magnetic stirrer-hot plate. While continuing stirring and maintaining the temperature at 120–130° C., the solution was titrated to a pink end point with standard 0.05 N potassium hydroxide in 30:70 ethanol:xylene using phenolphthalein as indicator.

Calculation:

$$\text{Milliequivs. COOH per gram} = \frac{(\text{ml. of KOH})(\text{N of KOH})}{(\text{g. of polymer})}$$

As an alternate method, the extent of oxidation of the polyethylene was determined by ascertaining the percent carbonyl of the oxidized polymer by measuring the intensity of infrared absorption at 1720 cm.$^{-1}$ assuming an absorbance characteristic of ketone type carbonyl. In actuality, other carbonyl containing functions such as aldehyde, carboxylic acid and carboxylate ester also contribute to the 1720 cm.$^{-1}$ absorption. Therefore, the values reported as percent carbonyl represent a composite of all of these groups. Measurements were made on a Perkin-Elmer Spectrophotometer, Model 221. The reported percent carbonyl is defined as $$\frac{\text{gms. C}=\text{O}}{\text{gms. polymer}} \times 100$$

The viscosity of the polyethylene emulsions were measured at 23° C. with a Brookfield Viscometer Model LVT using Spindle No. 1 at 60 r.p.m.

The ring and ball softening point of the polymer was measured in accord with ASTMD 28–58T.

Oxygen permeability was measured at 23±1° C. on an Air Permeability Tester "Z–170" manufactured by Zwick & Co., Einsinger bei Ulm in accord with the instructions therefor.

Melt indices (MI) were measured under the conditions specified in ASTMD 1238–57T under Condition E (melt index, i.e., MI) and Condition F (high load melt index, i.e., HLMI).

Densities of the polymer were measured under the conditions specified in ASTMD 1505–57T.

Reduced specific viscosity, i.e., RSV, was obtained by dissolving 0.1 g. of the polymer in 100 cc. Decalin at 135° C. in accord with the procedure of ASTMD 1601–61.

Hardness of the coatings from the oxidized polyethylene emulsions were measured under conditions specified in ASTMD 1706–61.

To measure tensile properties of coatings resulting from the emulsions, i.e., tensile stress at failure, percent elongation at failure and Young's modulus at 1% elongation, polymer pressed in film form (15–25 mils thick) was cut to ¼" sample strips placed in the jaws (2" apart) of a tensile strength tester (Instron, Model TT, available from Instron Engineering Inc., Quincy, Massachusetts) and separated at a rate of 1" per minute and a strain rate of 50% per minute at 23° C. and 50% relative humidity.

The percent gel content of the polymer in the instant invention was measured by refluxing a weighed sample (approximately 0.5 g.) of polymer in a cellulose Soxhlet thimble in xylene (containing 0.3 weight percent 2,6-ditertiary-butyl-4-methyl-phenol commercially available under the trade name "Ionol" from Shell Oil Corp.) for 24 hours. The insoluble portion of the polymer sample after drying was weighed to calculate percent gel as follows:

$$\text{percent gel} = \frac{\text{weight insoluble sample}}{\text{total weight sample}} \times 100$$

The abrasion resistance (milligrams/1000 cycles) of coatings from the emulsions was measured on an abraser with CS17 wheels and a 250 gm. load at 23±1° C. and 50% humidity. The abraser was manufactured by Taber Instrument Corp., North Tonawanda, N.Y., and measurements were made in accordance with the instructions therefor.

Unless otherwise noted all parts and percentages are by weight.

*Example 1*

57 pounds of commercially available polyethylene having a density of 0.950, a melting point of 137° C., a reduced specific viscosity of 4.5 and a high load melt index of 1.2 was coated with 1.5% benzoyl peroxide by weight and oxidized in air in a Stokes vacuum dryer for 30 hours at 120–125° C. The thus oxidized polyethylene on characterization had a density of 0.99, a melt index of 440, a reduced specific viscosity of 0.4, a melting point of 130° C. and contained 0.47 milliequivalent of carboxyl/gm. polymer and 0.78 millequivalent carbonyl/gm. polymer.

*Example 2*

To a Patterson Kelly 25 gal. stainless steel reactor equipped with an air stirrer (640 r.p.m.) was charged 47,250 ml. water, 10,500 gms. of oxidized polyethylene from Example 1, 630 ml. of a 33% KOH solution and 3150 ml. of a non-ionic emulsifier, i.e., a polyoxyethylene nonylphenol ether sold under the trade name "Renex 697" by Atlas Chemical Industries, Inc. The reactor was sealed, vigorous stirring was commenced and the reactor heated to 150° C. The mixture was maintained at 149–152° C. and 59–63 p.s.i.g. for 32 minutes with vigorous stirring. Stirring was continued while the thus formed emulsion was cooled to room temperature. The resulting emulsion containing 22.8% solids (17.5% solid oxidized polyethylene) had a viscosity of 6.3 centipoises at 23° C. and a pH of 9.9.

*Example 3*

125 gms. of the emulsion from Example 2 (17.5 wgt. percent oxidized polyethylene containing 0.78 milliequivalent carbonyl/gm. oxidized polyethylene) were charged to a 250 ml. beaker containing a magnetic stirrer. 1.3 gms. of hydrazine ($H_2N-NH_2$) were added to the beaker and stirring was continued at room temperature (25° C.) for 15 minutes. For characterization a sample of the thus-crosslinked emulsion was dried by evaporation and the remaining solids extracted with refluxing methanol overnight to remove emulsifying agent, KOH and any unreacted hydrazine. After drying the methanol-insoluble polymeric portion of the sample overnight at 25° C. in a vacuum oven, the polymer sample had a gel content of 47.9% and a high load melt index (HLMI) of 0.1.

The crosslinking step of Example 3 was repeated except that the crosslinking step was performed at 90° C. with stirring for 1 hour. The dried polymer had a gel content of 38.7% and a high load melt index of 0.1.

*Example 4*

Example 3 was repeated except that 2.4 gms. of ethylene diamine was used as the crosslinking agent instead of the 1.3 gms. of hydrazine. The dried polymer had a melt index of 98 when crosslinked at 25° C. and a melt index of 24 when crosslinked at 90° C.

Example 5

Example 3 was repeated except that 7.0 gms. of adipic acid dihydrazide was substituted as the crosslinking agent for the 1.3 gms. of hydrazine. The dried polymer had a melt index of 37.8 when crosslinked at 25° C. and a melt index of 48.1 when crosslinked at 90° C.

Example 6

Example 3 was repeated except that 3.6 gms. of carbohydrazide was substituted as the crosslinking agent for the 1.3 gms. of hydrazine. The dried polymer had a high load melt index of 0.1 on crosslinking at 25° C. and a high load melt index of 0.2 when crosslinked at 90° C.

Example 7

Example 3 was repeated except that 7.6 gms. of tetraethylene pentamine was employed as the crosslinking agent instead of the 1.3 gms. of hydrazine. The dried polymer had a high load melt index of 0.3 at 25° C. and a high load melt index of 1.1 when crosslinked at 90° C.

The following examples in Table I show the effect of concentration of the crosslinking agent on the amount of crosslinked polymer obtained. The emulsified polyethylene in Examples 8-12 inclusive had a melt index of 205 prior to crosslinking and the emulsified polyethylene in Examples 13-17 inclusive had a melt index of 6.0. The polyethylene was oxidized as in Example 1, emulsified as in Example 2 and crosslinked as in Example 3 except that the crosslinking was performed at 100° C. for 1 hour with varying amounts of hydrazine.

TABLE I

| Example No. | Hydrazine (Ml.) | Hydrazine No. of equivalents/No. of equivalents carbonyl in oxidized polyethylene | Crosslinked Polymer Percent gel | Crosslinked Polymer Melt Index (MI) |
|---|---|---|---|---|
| 8 | 2.0 | 8 | 62.3 | [1] 0.0 |
| 9 | 0.5 | 2 | 68.1 | [1] 0.0 |
| 10 | 0.3 | 1 | 57.9 | [1] 0.4 |
| 11 | 0.13 | 0.5 | 59.1 | [1] 1.8 |
| 12 | 0.06 | 0.25 | 1.3 | 5.6 |
| 13 | 2.0 | 8 | 68.3 | [1] 0.0 |
| 14 | 0.5 | 2 | 62.1 | [1] 0.0 |
| 15 | 0.3 | 1 | 28.7 | [1] 0.0 |
| 16 | 0.13 | 0.5 | 0.0 | [1] 0.1 |
| 17 | 0.06 | 0.25 | 0.0 | [1] 3.1 |

[1] High load melt index (HLMI) = 21,600 gms. load.

To show the superior properties obtained in coatings, impregnations, polishes and laminates from the emulsions of the present invention for the following comparative examples were performed.

Example 18

10,000 gms. of commercially available polyethylene were oxidized as in Example 1 until the oxidized polyethylene had a melting point of 130° C., a melt index of 700, a density of 0.99, a reduced specific viscosity of 0.4 and contained 0.47 milliequivalent of carboxyl/gm. polymer. 7000 gms. of the thus oxidized polyethylene were charged to a stirred reactor along with 31,500 gms. water, 420 ml. of 33% KOH and 2100 gms. of a nonionic emulsifier, i.e., a polyoxyethylene nonylphenol ether sold under the trade name "Renex 697" by Atlas Chemical Industries Inc. The reactor was sealed, stirring was commenced and the reactor heated to 150° C. The mixture was maintained at 148-151° C. and 61-67 p.s.i.g. for 30 minutes during emulsification. Stirring was continued while the thus formed emulsion was cooled to room temperature. The resulting emulsion containing 22% solids (16.9% solid polymer) had a viscosity of 5.8 cps., and a pH of 8.5. A portion of this emulsion (200 ml.) was set aside for characterization as the control. Another 200 ml. of the emulsion was transferred to a 250 ml. beaker equipped with a magnetic stirrer. Stirring was commenced and 0.16 gm. of hydrazine (0.36 equivalent hydrazine/equivalent of carbonyl in the polyethylene) was added to the beaker. After 15 minutes the stirring was discontinued. The 200 ml. of the control (uncrosslinked) emulsion and the 200 ml. of the crosslinked emulsion were each poured into a baking dish and allowed to air dry. The solids were removed, weighed to a constant weight and samples of each were pressed into 6" x 6" x 18 mil. plaques on a platen press at 350° F. under 25,000 pounds pressure for 1 minute. The pressed samples were characterized with the results as shown in Table II.

TABLE II

| Sample | Tensile Strength (p.s.i.) | Tensile Modulus (p.s.i.) | Percent Elongation | Shore D Hardness |
|---|---|---|---|---|
| Control (uncrosslinked) | 965 | $1.0 \times 10^5$ | 2.5 | 39.8 |
| Crosslinked | 1,275 | $8.3 \times 10^4$ | 4.6 | 52.4 |

To show the operability of the present invention with commercially available low density polyethylenes containing oxygen-containing functional groups, e.g., carbonyl groups, the following runs were made.

Example 19

To a two-quart "Chemco" stirred reactor equipped with a high speed air stirrer was charged 200 gms. of oxidized polyethylene sold under the trade name "Epolene E-10" having a crystalline melting point of 97-102° C., a reduced specific viscosity of 0.19, a melt index of approximately 3600 and containing 0.34 milliequivalent of carboxyl/gm. polymer and 0.67 milliequivalent carbonyl/gm. polymer. 9.0 ml. of a 33% KOH solution, 60.0 ml. of a non-ionic emulsifier, i.e., a polyethylene nonylphenol ether sold under the trade name "Renex 697" and 900 ml. of water were also added to the reactor. The reactor was sealed, vigorous stirring was commenced and the reactor heated to 150° C. The mixture was maintained at 150-153° C. and 51-59 p.s.i.g. for 30 minutes. Stirring was continued while the thus formed emulsion was cooled to room temperature. The resulting emulsion containing 22.75% solids (17.5% solid oxidized polyethylene), had a viscosity of 6.5 at 23° C. and a pH of 7.5. 125 gms. of the emulsion were transferred to a beaker equipped with a magnetic stirrer and 2 cc. of hydrazine were added to the emulsion for the crosslinking reaction. After stirring for 1 hour at room temperature (25° C.) the stirring was discontinued and the polymer prepared for characterization. A sample of the thus-crosslinked emulsion was dried by evaporation and extracted with refluxing methanol overnight to remove the emulsifying agent (Renex 697), KOH and any unreacted hydrazine. After drying the insoluble portion of the polymer sample overnight at 25° C. in a vacuum oven the polymer had a gel content of 38.0% and a high load melt index of 157.

A control run using "Epolene E-10" treated in the same manner as the "Epolene E-10" in Example 19 except that no hydrazine was added to the polymer emulsion resulted in a polymer having a melt index of approximately 3600 and a 0% gel content.

Example 20

300 gms. of a commercially available emulsifiable polyethylene sold under the trade name "A-C Polyethylene 629" having a crystalline melting point in the range 92-94° C., a reduced specific viscosity of 0.14, a melt index approximately 12,000 and containing 0.31 milliequivalent of carboxyl/gm. polymer and 0.61 milliequivalents of carbonyl/gm. polymer, were charged to a two quart "Chemco" stirred reactor along with 90 ml. of "Renex 697" (an emulsifying agent), 13.5 ml. of a 33% KOH solution and 1350 ml. of water. The reactor was sealed, vigorous stirring was commenced and the mixture heated to 150° C. The mixture was maintained at 150–152° C. and 54–58 p.s.i.g. for 31 minutes during the emulsification step. Stirring was continued while the thus formed emulsion was cooled to room temperature. The resulting emulsion contained 22.6% solids and had a viscosity of 186.0 cps. at 23° C. and a pH of 8.0. 125 gms. of the emulsion were transferred to a beaker equipped with a magnetic stirrer and 2 cc. of hydrazine were added to the emulsion for the crosslinking reaction. After stirring for about 10 minutes at room temperature (25° C.) the reaction was discontinued and the polymer was prepared for characterization by the method in Example 19. The isolated dried polymer had a melt index of approximately 400.

To show the inoperability of the present invention when the emulsified polymer contains no oxygen-containing functional groups, i.e., carbonyl groups, the following run was performed.

*Example 21*

To a beaker containing 62.5 gms. of a commercially available non-ionic polyethylene emulsion (40.8% solids) sold under the trade name "Poly Em" prepared by emulsion polymerization, said polyethylene containing no carbonyl-containing functional groups, was added 62.5 gms. water resulting in a 20.4% solid emulsion. 2.0 cc. hydrazine was added to the emulsion and stirring by magnetic stirrer was continued for 1 hour at room temperature. Samples of the emulsified polymer were prepared as in Example 19 for characterization. The polymer had a melt index of 1.6 and a nil gel content. A control run as in Example 21 without hydrazine resulted in a polymer having a melt index of 0.9 and a nil gel content Thus it can be seen that it is necessary to have oxygen-containing functional groups, i.e., carbonyl groups present in the emulsified polymer for the crosslinking reaction to occur.

The following example in Table II shows the improvement obtained in barrier properties when coatings from crosslinked emulsions are applied to a permeable surface such as paper.

*Example 22*

50 pounds of commercially available polyethylene having a density of 0.954, a high load melt index of 1.8, a melting point of 137° C. and a reduced specific viscosity of 4.4 was oxidized in a Stokes vacuum dryer for 24 hours at a temperature of 123° C. The thus oxidized polymer after oxidation containing 0.78 milliequivalent carbonyl/gm. polymer and 0.36 milliequivalent carboxyl/gm. polymer had a melt index of 240 and a reduced specific viscosity of 0.45.

300 gms. of the thus oxidized polyethylene along with 90 ml. Renex 697 (emulsifying agent), 15 ml. of a 33% KOH solution and 900 ml. of water were charged to a "Chemco" stirred reactor. The reactor was sealed and heated to 150° C. with vigorous stirring. After 31 minutes at 150–155° C. and 53–63 p.s.i.g. the emulsification step was discontinued and the reactor cooled to room temperature (25° C.) with stirring. One portion of this emulsion was set aside for a control coating and other portions of the thus formed emulsion were reacted with varying amounts of hydrazine for 30 minutes at 25° C. to form crosslinked polyethylene emulsions. The thus crosslinked emulsions were applied to a sheet of 17 pt. clay coated paper as two coatings, with a one-half hour in between drying period, by means of a #10 rod. The coatings were of a high gloss. The dried coatings were then consolidated by passing the coated paper sheet by an infrared source heated to 1000° F. at a distance of ¼" and a speed of 3½–4" per minute. The oxygen permeability of the coated sheets was measured against a control consisting of the same type of paper coated with an emulsion in the same manner as aforestated except that the emulsion was not crosslinked with hydrazine. The results of the oxygen permeability test are reported in Table III.

TABLE III

| Example No. | Equivalents Hydrazine/ Equivalent carbonyl in Polymer | Oxygen Permeability $\left(\dfrac{10^{-3} \times \text{cc.} \times \text{mils thickness}}{\text{days} \times \text{atm.} \times M^2}\right)$ |
|---|---|---|
| 22a | 0.75 | 43 |
| 22b | 0.50 | 78 |
| 22c | 0.33 | 77 |
| 22 control | None | 157 |

The following example shows the operability of a precurser of the polyfunctional compounds suitable as crosslinking agents in the instant invention.

*Example 23*

125 gms. of the emulsion from Example 2 containing 22.8% total solids (17.5% oxidized polyethylene) and 0.78 milliequivalent carbonyl/g. polymer were added to a stirred reactor along with 1.8 gms ethylenediamine carbamate sold under the trade name "DIAK #2" by E. I. du Pont de Nemours & Co. The reactor was heated to 100° C. and stirred for 1 hour at that temperature. The reaction was discontinued and the reactor was cooled to room temperature with continuous stirring. The crosslinked emulsified polymer was characterized for melt index and percent gel content as follows. A sample of the crosslinked emulsion was dried by evaporation and the remaining solids extracted with refluxing methanol overnight to remove emulsifying agent, KOH and any unreacted precurser of crosslinking agent. After drying the insoluble portion of the extracted sample overnight at 25° C. in a vacuum oven, the polymer had a melt index of 68.4.

*Example 24*

500 gms. of commercially available polyethylene having a density of 0.953, a high load melt index of 1.5, a reduced specific viscosity of 4.3 and a melting point of 137° C. were oxidized by the procedure of Example 2 until the polymer contained 0.41 milliequivalent carboxyl/gm. polymer and 0.75 milliequivalent carbonyl/gm. polymer, and had a melt index of 440 and a reduced specific viscosity of 0.4. 100 gms. of the thus oxidized polymer were charged to a 2 quart "Chemco" stirred reactor along with 17.9 ml. oleic acid, 17.5 ml. morpholine and 450 ml. of water. The reactor was sealed and heated to 150° C. with vigorous stirring. During the 31 minute emulsification the temperature was maintained at 150–154° C. and the pressure was 54–60 p.s.i.g. The reactor was cooled with vigorous stirring. A 125 gm. sample of the emulsion was removed and charged to a 250 ml. beaker containing a magnetic stirrer. For crosslinking the polymer, 2.0 cc. of hydrazine were added to the emulsion and agitation was continued for about 15 minutes at room temperature (25° C.). A sample of the thus crosslinked emulsion was removed to characterize the polymer for melt index and gel content after the following preparation. The sample of the thus crosslinked emulsion was dried by evaporation and the remaining solids were extracted with refluxing methanol overnight to remove the emulsifying agent and any unreacted hydrazine. After drying the methanol-insoluble polymeric portion of the sample overnight at 25° C. in a vacuum oven, the polymer sample had 17.3% gel content and a melt index of 5.0.

The following example shows the operability of the present invention using copolymers containing ethylene in an amount in the range 99.9–50 mole percent of the copolymer.

*Example 25*

500 gms. of an ethylene-butylene copolymer (0.6 mole percent butylene) having a high load melt index of 1.7, a density of 0.939, a melting point of 125–127° C. and a reduced specific viscosity of 4.7 were coated with 0.5% by weight benzoyl peroxide and oxidized for 23 hours at 100° C. in a Stokes vacuum dryer. The oxidized copolymer had a melt index of 760, a melting point of 123.5° C. and contained 0.61 milliequivalent carbonyl/gm. copolymer. 100 gms. of the thus-oxidized copolymer were charged to a 2-quart "Chemco" stirred reactor along with 30 gms. "Renex 697" (emulsifying agent), 5 ml. of 33% KOH and 450 ml. water. The reactor was sealed and heated to 150–153° C. and 56–60 p.s.i.g. pressure while the 30-minute emulsification was carried out with vigorous stirring. The emulsion was cooled and on characterization had a percent total solids of 21.5, a viscosity of 7.0 and a pH of 10.5. 125 gms. of the emulsion were charged to a 250 ml. beaker equipped with a magnetic stirrer. 2 cc. hydrazine were added to the beaker to effect crosslinking and stirring was continued for 15 minutes at room temperature. The polymer was characterized after evaporating a sample of the emulsion to dryness, extracting emulsifying agent, KOH and unreacted hydrazine in refluxing methanol overnight followed by drying of the methanol insoluble polymeric material overnight at 25° C. in a vacuum oven. The polymer on characterization had a melt index of 5.0.

*Example 26*

700 ml. of the emulsion from Example 2 were charged to a two-quart "Chemco" stirred reactor. The reactor was sealed and heated to 150° C. with vigorous stirring. After 15 minutes at 150–154° C. and 57–63 p.s.i.g., 3 ml. hydrazine were added under pressure to the reactor and stirring was continued for 30 minutes at 154° C. The reactor was cooled with continuous stirring to room temperature. The crosslinked polymer was characterized by drying a sample of the emulsion by evaporation and extracting the solids with refluxing methanol overnight to remove emulsifying agent, KOH and any unreacted hydrazine. After drying the methanol-insoluble polymeric portion of the sample overnight at 25° C. in a vacuum oven, the polymer sample had a gel content of 83.0%, a high load melt index of 0.0 and a melting point of 122–126° C.

In practicing this invention it is possible and sometimes desirable without departing from the scope to add fillers, dyes, pigments, protective colloids, antistatic agents, antioxidants, UV inhibitors, and the like to modify the properties of the emulsion and/or the film, coating, laminate, impregnate or polish resulting from application of said emulsion. The above additives could be added prior to the emulsification step, but in most instances would be added to the finished emulsion, either before or after addition of the crosslinking agent.

The following examples show some typical end uses for the crosslinked emulsion of the instant invention.

*Example 27*

The crosslinked emulsion from Example 3 was used. Cotton and rayon swatches, 14 x 14 inches, were conditioned (at 70° F. and 65% R.H.) and then weighed. Each swatch was immersed in a diluted emulsion from Example 3, padded to a calculated wet pick-up, mounted on a pin frame at its original dimensions, dried for 10 minutes at 250°–300° F., reconditioned for 24 hours and weighed again. The actual amount of crosslinked polymer added on to the fabric was obtained directly from the increase in conditioned weight. Total add-ons ranging from 0.0 (control) to 3.0 wt. percent were examined. The fabrics treated as above and containing add-ons in the range of 0.03 to 2.0% showed increased warp tear strength (Elmendorf tear) compared to control samples which were treated with water instead of the dilute crosslinked polyethylene emulsion. In addition, the treated fabrics were softer to the touch than the untreated controls. Similar results were obtained when swatches of cotton printcloth were treated with dimethylol-ethylene urea (6% based on fabric weight) to give wash-wear properties to the fabric prior to treatment with the crosslinked polyethylene emulsion.

*Example 28*

Again the crosslinked emulsion from Example 3 was used after dilution with water to a total solids content of 15%. A bright-dry floor polish formulation was prepared by admixing the following ingredients:

| | Gallon |
|---|---|
| Neo Cryl A 247 H acrylic copolymer @ 15% | 6.8 |
| Crosslinked polyethylene emulsion @ 15% | 2.1 |
| Ammonia cut Shanco 334 resin @ 15% | 1.4 |
| KP–140 (plasticizer) | .04 |
| Carbitol (fluxing agent) | 0.16 |

The polish was applied in standard fashion to squares of light-colored asphalt tile. As a "control," a similar number of the same type of tiles were treated with a commercially available uncrosslinked oxidized polyethylene-containing bright-dry polish formulation. Both sets of tiles were placed side-by-side in a heavily trafficked hallway for a period of 4 weeks. After this period of time, it was observed that the tiles coated with the formulation containing the crosslinked emulsion of the present invention were much superior to the "control" tiles in the area of general durability; this includes such characteristics as soil resistance, rubber heel-mark resistance, scuff resistance and resistance to yellowing.

*Example 29*

A strip of high density polyethylene film 1″ x 6″ x .010″ was treated on one side by brushing on a coating of crosslinked polyethylene emulsion from Example 3. The sample was air dried for 20 minutes, and a second coating of the same emulsion was applied. This coating was also dried for 30 minutes in air at room temperature. On top of the dried coating was placed a strip 1″ x 6″ x .006″ of aluminum foil. The "sandwich" thus formed was transferred to a hydraulic press preheated to 130° C. and pressed between the platens of the press for 2 minutes at a pressure of 50–100 p.s.i. The plastic-to-metal laminate thus formed could not be separated without rupture of the aluminum foil film. The example was repeated with equivalent success wherein aluminum (1″ x 6″ x .006″), and brass (1″ x 6″ x .010″) strips were used in place of the high density polyethylene in the above described laminate.

*Example 30*

Sheets of 17 pt. clay coated paper were coated with the uncrosslinked control emulsion from Example 22 and the crosslinked emulsion from Example 22 containing 0.75 equivalent hydrazine/equivalent carbonyl in the polymer. The procedure for coating was the same as that employed in Example 22. The paper coated with the crosslinked emulsion was rated excellent and superior to the control (paper coated with the uncrosslinked emulsion) in regard to gloss, grease resistance, resistance to hot water and steam and in flexibility. Further in contrast to polyethylene coated paper prepared by an extrusion process, the crosslinked coating of the present invention showed excellent receptivity and adhesion to printing inks.

It has also been found that the chemical reaction on which this invention is based can give unique emulsion product derivatives under conditions whereby crosslinking cannot take place. Compounds containing only one alkaline reacting primary amino (—$NH_2$) group/molecule will also react with emulsified oxidized α-olefin polymeric materials, but in a non-crosslinking fashion, e.g., a grafting reaction. If, for example, the compound is a primary/tertiary diamine or a primary/secondary diamine, only the primary amino group will react with and become chemically attached to the carbonyl groups of the polymeric chains. Thus the tertiary amino (or secondary amino) groups in such compounds are left free (i.e., pendant to the main chain) to interact physically or chemically with a substrate material (e.g., cellulose fibers, textile fibers and fabrics, metallic or wood surfaces, inorganic filler surfaces, and the like) to which the emulsion is to be applied. As another example, high molecular weight polymeric materials containing one alkaline reacting primary amino group/molecule in undergoing the same reaction as described above would by attachment through the carbonyl groups of the oxidized α-olefin polymer chains lead to the formation of graft polymers having unique structure and physical properties.

I claim:
1. A composition useful in the production of a crosslinked polymeric emulsion comprising (A) an emulsion containing an oxidized α-olefin polymeric material, said α-olefin polymeric material consisting of at least 50 mole percent ethylene and containing 0.1 to 4.0 milliequivalents carbonyl/gm. of oxidized α-olefin polymeric material and (B) 0.05 to 20.0 milliequivalents/milliequivalent of carbonyl in said polymeric material of a polyfunctional compound containing at least two alkaline reacting primary amino ($-NH_2$) groups.

2. A composition useful in the production of a crosslinked polyethylene emulsion comprising (A) an emulsion containing oxidized polyethylene, said polyethylene containing 0.1 to 4.0 milliequivalents carbonyl/gm. of oxidized polyethylene and (B) 0.05 to 20.0 milliequivalents/milliequivalent of carbonyl in said polyethylene of a polyfunctional compound containing at least two alkaline reacting primary amino ($-NH_2$) groups.

3. A composition useful in the production of a crosslinked ethylene-butylene copolymer emulsion comprising (A) an emulsion containing oxidized ethylene-butylene copolymer, said copolymer containing 0.1 to 4.0 milliequivalents carbonyl/gm. of oxidized copolymer and (B) 0.05 to 20.0 milliequivalents/milliequivalent of carbonyl in said copolymer of a polyfunctional compound containing at least two alkaline reacting primary amino ($-NH_2$) groups.

4. The composition according to claim 1 wherein the polyfunctional compound is hydrazine.

5. The composition according to claim 1 wherein the polyfunctional compound is ethylene diamine.

6. The composition according to claim 1 wherein the polyfunctional compound is adipic acid dihydrazide.

7. The composition according to claim 1 wherein the polyfunctional compound is carbohydrazide.

8. The composition according to claim 1 wherein the polyfunctional compound is tetraethylene pentamine.

9. The composition according to claim 1 wherein the polyfunctional compound is formed in situ.

10. The composition according to claim 9 wherein the polyfunctional compound is ethylene diamine.

11. The process of forming a crosslinked polymeric emulsion comprising reacting an emulsion containing an oxidized α-olefin polymeric material, said α-olefin polymeric material consisting of at least 50 mole percent ethylene and containing 0.1 to 4.0 milliequivalents carbonyl/gm. of oxidized α-olefin polymeric material with 0.05 to 20.0 milliequivalents/milliequivalent of carbonyl in said polymeric material of a polyfunctional compound containing at least two alkaline reacting primary amino ($-NH_2$) groups.

12. The process of forming a crosslinked polyethylene emulsion comprising reacting an emulsion containing oxidized polyethylene, said polyethylene containing 0.1 to 4.0 milliequivalents carbonyl/gm. of oxidized polyethylene with 0.05 to 20.0 milliequivalents/milliequivalent of carbonyl in said polyethylene of a polyfunctional compound containing at least two alkaline reacting primary amino ($-NH_2$) groups.

13. The process of forming a crosslinked ethylene-butylene copolymer emulsion comprising reacting an emulsion containing oxidized ethylene-butylene copolymer, said copolymer consisting of at least 50 mole percent ethylene and containing 0.1 to 4.0 milliequivalents carbonyl/gm. of oxidized copolymer with 0.05 to 20.0 milliequivalents/milliequivalent of carbonyl in said copolymer of a polyfunctional compound containing at least two alkaline reacting primary amino ($-NH_2$) groups.

14. The process according to claim 11 wherein the polyfunctional compound is hydrazine.

15. The process according to claim 11 wherein the polyfunctional compound is ethylene diamine.

16. The process according to claim 11 wherein the polyfunctional compound is adipic acid dihydrazide.

17. The process according to claim 11 wherein the polyfunctional compound is carbohydrazide.

18. The process according to claim 11 wherein the polyfunctional compound is tetraethylene pentamine.

19. The process according to claim 11 wherein the polyfunctional compound is formed in situ.

20. The process according to claim 19 wherein the polyfunctional compound is ethylene diamine.

21. The process comprising impregnating textile fabrics with the composition of claim 1.

22. An article comprising a textile fabric impregnated with the composition of claim 1.

23. An article comprising a textile fabric impregnated with the composition of claim 2.

24. An article comprising a textile fabric impregnated with the composition of claim 3.

25. The process comprising coating paper with the composition of claim 1.

26. An article comprising a paper coated with the composition of claim 1.

27. An article comprising a paper coated with the composition of claim 2.

28. An article comprising a paper coated with the composition of claim 3.

29. The process of laminating metal objects which comprises coating one of said metal objects with the composition of claim 1, allowing said coating to dry, placing another metal object in juxtaposition to said coating and compressing said metal objects while heating to a temperature at or above the melting point of the α-olefin polymeric material in said emulsion to effect adhesion.

30. An article comprising metal objects having therebetween the composition of claim 1.

References Cited by the Examiner

UNITED STATES PATENTS

| | | | |
|---|---|---|---|
| 2,200,429 | 5/1940 | Perrin et al. | 260—29.6 |
| 3,171,830 | 3/1965 | Kehr | 260—94.9 |

FOREIGN PATENTS

| | | |
|---|---|---|
| 476,476 | 8/1951 | Canada. |

MURRAY TILLMAN, *Primary Examiner.*

J. ZIEGLER, *Assistant Examiner.*